United States Patent
Lu et al.

(10) Patent No.: US 8,336,367 B2
(45) Date of Patent: Dec. 25, 2012

(54) DETECTION SENSOR, VIBRATOR

(75) Inventors: Jian Lu, Ibaraki (JP); Tsuyoshi Ikehara, Ibaraki (JP); Takashi Mihara, Tokyo (JP)

(73) Assignees: National Institute of Advanced Industrial Science and Technology, Tokyo (JP); Olympus Corporation, Tokyo (JP)

( * ) Notice: Subject to any disclaimer, the term of this patent is extended or adjusted under 35 U.S.C. 154(b) by 337 days.

(21) Appl. No.: 12/555,221

(22) Filed: Sep. 8, 2009

(65) Prior Publication Data

US 2010/0107736 A1    May 6, 2010

Related U.S. Application Data

(63) Continuation of application No. PCT/JP2008/053793, filed on Mar. 3, 2008.

(30) Foreign Application Priority Data

Mar. 16, 2007  (JP) .................................. 2007-068570
Nov. 26, 2007  (JP) .................................. 2007-304936

(51) Int. Cl.
*G01N 29/02* (2006.01)
(52) U.S. Cl. ..................................................... 73/24.06
(58) Field of Classification Search ................ 73/24.06
See application file for complete search history.

(56) References Cited

U.S. PATENT DOCUMENTS

| | | | |
|---|---|---|---|
| 6,100,524 A | 8/2000 | Yagi | |
| 6,326,563 B1 * | 12/2001 | Takeuchi et al. | ........... 73/862.59 |
| 2004/0189155 A1 | 9/2004 | Funakubo | |
| 2005/0016277 A1 | 1/2005 | Takeuchi | |

FOREIGN PATENT DOCUMENTS

| | | |
|---|---|---|
| JP | 06-269186 A | 9/1994 |
| JP | 10-282130 A | 10/1998 |
| JP | 2849697 B2 | 1/1999 |
| JP | 11-113920 A | 4/1999 |
| JP | 2000-180250 A | 6/2000 |

(Continued)

OTHER PUBLICATIONS

Chinese Office Action for counterpart application CN200880005713.X filed Mar. 3, 2008.
Cherian S, Thundat T; Determination of adsorption-induced variation in the spring constant of a microcantilever. IN: Applied Physics Letters, vol. 80, No. 12; Mar. 25, 2002; pp. 2219-2221.
International Search Report for PCT/JP2008/053793; May 20, 2008.
Japanese Office action for counterpart application JP2007-304936; Dec. 7, 2011.

*Primary Examiner* — Peter Macchiarolo
*Assistant Examiner* — Alex Devito
(74) *Attorney, Agent, or Firm* — Pearne & Gordon LLP

(57) ABSTRACT

An object of the present invention is to provide a detection sensor and a vibrator which can offer improved sensitivity. The present invention uses a scheme in which no piezoelectric layer, drive electrode, or the like is provided on the surface of a vibrator 30 and in which the vibrator 30 is driven by an actuator 40 provided separately from the vibrator 30. The actuator 40 is of a cantilever type and is provided near a fixed end 30a of the vibrator 30. Vibration of the actuator 40 is transmitted to the vibrator 30 via a coupling beam 70. Thus, vibration of the vibrator 30 is prevented from being inhibited by a piezoelectric layer, a drive electrode, or the like. This improves the Q value of the vibrator 30 and thus the sensitivity of the detection sensor 10. Furthermore, if the detection sensor 10 is configured to offer a sensitivity equivalent to that of a conventional one, the size of the detection sensor 10 can be sharply reduced compared to that of the conventional one.

16 Claims, 9 Drawing Sheets

FOREIGN PATENT DOCUMENTS

| | | |
|---|---|---|
| JP | 3298897 B2 | 7/2002 |
| JP | 2004-297951 A | 10/2004 |
| JP | 2006-71371 A | 3/2006 |
| WO | 9913300 A1 | 3/1999 |

* cited by examiner

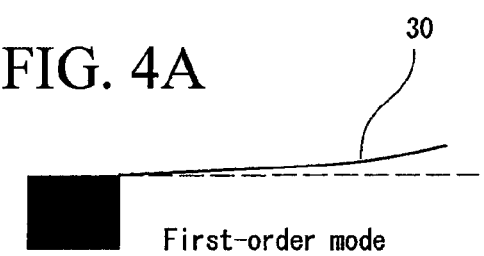
FIG. 4A First-order mode
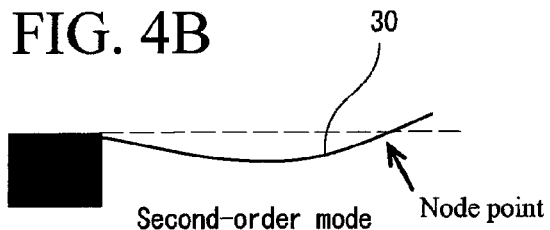
FIG. 4B Second-order mode Node point
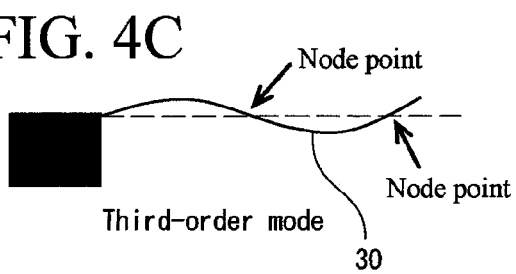
FIG. 4C Third-order mode Node point
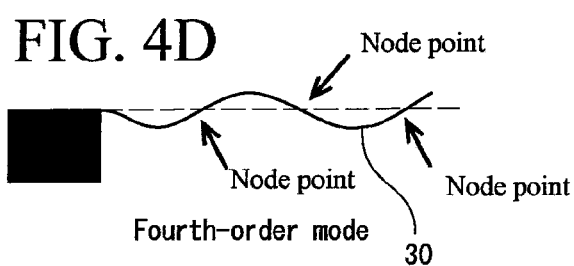
FIG. 4D Fourth-order mode Node point First-order mode Second-order mode Third-order mode Forth-order mode Second-order mode Third-order mode Fourth-order mode

DETECTION SENSOR, VIBRATOR

TECHNICAL FIELD

The present invention relates to a detection sensor suitably used to detect the presence of a substance with a mass, the mass of the substance, and the like.

BACKGROUND ART

A sensor has been available which detects the presence of a potentially explosive gas, a toxic gas, or the like, or its quantitative concentration. This sensor adsorbs a particular type of molecules contained in the gas to detect whether or not molecules have been actually adsorbed, or the amount of molecules adsorbed. The sensor thus detects the presence or concentration of any gas. Such a sensor is installed in facilities, equipment, apparatuses, and the like which handle gas, to control gas leakage or amount.

Much effort has been made to develop fuel cells in recent years. Since fuel cells use hydrogen, it is preferable to monitor hydrogen stations as well as vehicles, apparatuses, instruments, and the like which use fuel cells, for hydrogen leakage. The above sensor can be used for these applications.

The sensor adsorbing a particular type of molecules to detect whether or not molecules have been actually adsorbed, or the amount of molecules adsorbed can be used not only for the above applications but also for the following: for example, analysis of freshness or components of foods, environmental control for providing and maintaining a comfortable space, and sensing of conditions of a living organism such as a human body.

Some such sensors may be based on a scheme using a cantilever. In this scheme, a molecule adsorption film (sensitive film) is provided on the cantilever to adsorb a particular type of molecules. Adsorption of molecules is detected on the basis of a change in the condition of the cantilever which occurs when molecules are adsorbed on the molecule adsorption film. Adsorption of molecules on the molecule adsorption film changes the stress of the molecule adsorption film. This changes the deflection amount of the cantilever, which makes it possible to detect that the particular type of molecules has been adsorbed. Further, the adsorption of molecules increases the mass of the molecule adsorption film, thus changing the resonance frequency of a system consisting of the cantilever and the molecule adsorption film. Accordingly, adsorption of the particular types of molecules can also be detected on the basis of the change in the resonance frequency (see, for example, Non-Patent Document 1).

It has already been reported that the scheme enables the realization of sensing of hydrogen gas by using an adsorption film made of platinum or palladium to adsorb hydrogen molecules, sensing of alcohol components using a PMMA polymer, sensing of smells of foods, and the like. With a method of detecting a change in the resonance frequency of the cantilever, when particular molecules are adsorbed to the adsorption film to very slightly change the mass of the film, the resonance frequency of the cantilever, which has a large resonance Q value, changes by very sensitively responding to the change in the mass. This enables improved sensing.

With the conventional method of sensing gas using a change in the resonance frequency of the cantilever, the sensor itself can be comprised of a cantilever of size several tens of μm to several hundred μm which is produced by a micromachining technology. This method is thus characterized by enabling a reduction in the size of the sensor and enabling the resonance Q value to be increased as previously described. Consequently, this configuration is excellent in size reduction and improved sensitivity.

When such a cantilever is used for sensing, to allow the cantilever to be vibrated (driven), a piezoelectric layer made of any of various piezoelectric materials and an electrode layer made of metal are provided on the surface of the cantilever main body formed of a silicon-containing material such as $SiO_2$ (silicon dioxide). Then, the electrode layer applies a voltage to the piezoelectric layer to vibrate the cantilever. A change in the resonance frequency of the cantilever is then monitored.

As the piezoelectric material forming the piezoelectric layer, what is called a ferroelectric thin film formed of a material containing Pb (lead), Zr (zirconium), and Ti (titanium) has been gathering much attention.

Non-Patent Document 1: Suman Cherian, Thomas Thundat, "Determination of adsorption-induced variation in the spring constant of a microcantilever", Applied Physics Letter, 2002, Vol. 80, No. 12, pp. 2219 to 2221).

However, there has constantly been a demand for an increase in the sensitivity of a sensor using a vibrator the vibration property of which is changed by adhesion of a very small mass to the sensor as described above.

The piezoelectric layer made of the ferroelectric thin film and the electrode layer are provided on the surface of the cantilever. The piezoelectric layer and the electrode layer themselves suffer attenuation, resulting in a loss in the vibration energy of the cantilever. This reduces the Q value of the cantilever and thus the sensitivity of the sensor. In this regard, the conventional technique still has room for improvement.

MEANS FOR SOLVING THE PROBLEMS

A detection sensor of the present invention comprises a vibrator shaped like a beam with one or both ends thereof fixed, the vibrator offering a vibration property changed by adhesion or adsorption of a substance with a mass to the vibrator, an actuator provided near the vibrator and vibrating so as to exhibit a set vibration property, a coupling member coupling the actuator and the vibrator together to transmit vibration of the actuator to the vibrator to vibrate the vibrator, and a detection section detecting the substance by detecting a change in vibration of the vibrator.

In such a detection sensor, when the actuator is vibrated, the vibration of the actuator is transmitted to the vibrator via the coupling member. Thus, the vibrator can be driven. In this manner, the actuator provided separately from the vibrator vibrates the vibrator. This eliminates the need to provide a piezoelectric layer made of a piezoelectric material, a drive electrode, or the like on the surface of the vibrator as in the prior art. This prevents the vibration property of the vibrator from being inhibited; the vibrator can be driven so as to exhibit an enhanced vibration property.

Here, the actuator comprises a beam-shaped actuator main body with one or both ends thereof fixed, a piezoelectric layer made of a piezoelectric material and provided on a surface of the actuator main body in order to vibrate the actuator main body, and a drive electrode provided on the surface of the actuator main body to apply a voltage to the piezoelectric layer. That is, the actuator is of a cantilever type similarly to the vibrator.

When the piezoelectric layer is provided on the surface of the actuator main body, the actuator main body is warped by residual stress present in the piezoelectric layer. Thus, a straightening member is preferably provided to straighten the actuator main body.

Furthermore, when the vibrator vibrates in a fluid such as air, a boundary layer is formed in a portion of the fluid located near the surface of the vibrator. Inside the boundary layer, the fluid moves generally in conjunction with the vibration of the vibrator. When the actuator or the like is present in the boundary layer, the vibration of the vibrator is inhibited. Thus, the actuator and the vibrator are preferably provided at a distance from each other which distance is larger than the thickness of the boundary layer.

The detection section can also detect whether or not any substance is adhered or adsorbed to the vibrator and also detect the amount of substance adhered to the vibrator. In this case, when particular molecules or plural types of molecules having particular properties or characteristics are adsorbed or adhered onto the vibrator, the detection sensor can detect the particular molecules or the plural types of molecules having the particular properties or characteristics.

Such a detection section may be based on any scheme. However, the detection section is preferably made of a piezo resistance element provided near the fixed end of the vibrator to detect a change in stress caused by vibration of the vibrator.

The vibrator is driven as described above by transmitting a driving force from the actuator to the vibrator via the coupling member. In the structure of the detection sensor, the coupling member is coupled to the vibrator at a position distant from the fixed end of the vibrator. This results in a loss in vibration energy transmitted from the actuator to the vibrator. This is because when the coupling member is coupled to a position where the vibrator vibrates at a high amplitude, the vibration of the vibrator is inhibited by the coupling member. Furthermore, when the vibrator vibrates, an energy loss is also caused by the piezoelectric layer and the like formed on the surface of the vibrator. The energy loss increases consistently with the order of the vibration mode of the vibrator.

If the vibrator is driven in a vibration mode of a high order, that is, a second order or higher, the amplitude of the vibrator is zero at a certain node. The coupling member is preferably coupled to the vibrator at or near the position of the node. This enables the vibrator to be driven in the above-described particular vibration mode and allows an energy loss to be inhibited.

The present invention may provide a vibrator comprising a beam-like vibrator main body with one or both ends thereof fixed, an actuator provided near the vibrator main body and vibrating so as to exhibit a set vibration property, and a coupling member coupling the actuator and the vibrator main body together to transmit vibration of the actuator to the vibrator main body to vibrate the vibrator main body.

Such a vibrator can be used not only for such a detection sensor as described above but also for various applications based on monitoring of a change in the vibration property of the vibrator.

BRIEF DESCRIPTION OF THE DRAWINGS

FIGS. 4A, 4B, 4C and 4D are diagrams showing how the vibrator is vibrated in the configuration according to the present embodiment;

DESCRIPTION OF SYMBOLS

10 . . . Detection sensor, 20 . . . Adsorption section, 30 . . . Vibrator, 30*a* . . . Fixed end, 30*b* . . . Free end, 40 . . . Actuator, 40*a* . . . Fixed end, 40*b* . . . Free end, 43, 46 . . . Electrode layers, 44 . . . Piezoelectric layer, 49 . . . Straightening beam, 50 . . . Detection section, 51 . . . Detecting piezo resistance element, 52 . . . Reference piezo resistance element, 60 . . . Substrate, 70 . . . Coupling beam (coupling member)

DETAILED DESCRIPTION OF PREFERRED EMBODIMENTS

First Embodiment

The present invention will be described below in detail based on embodiments shown in the accompanying drawings.

Figure 1:
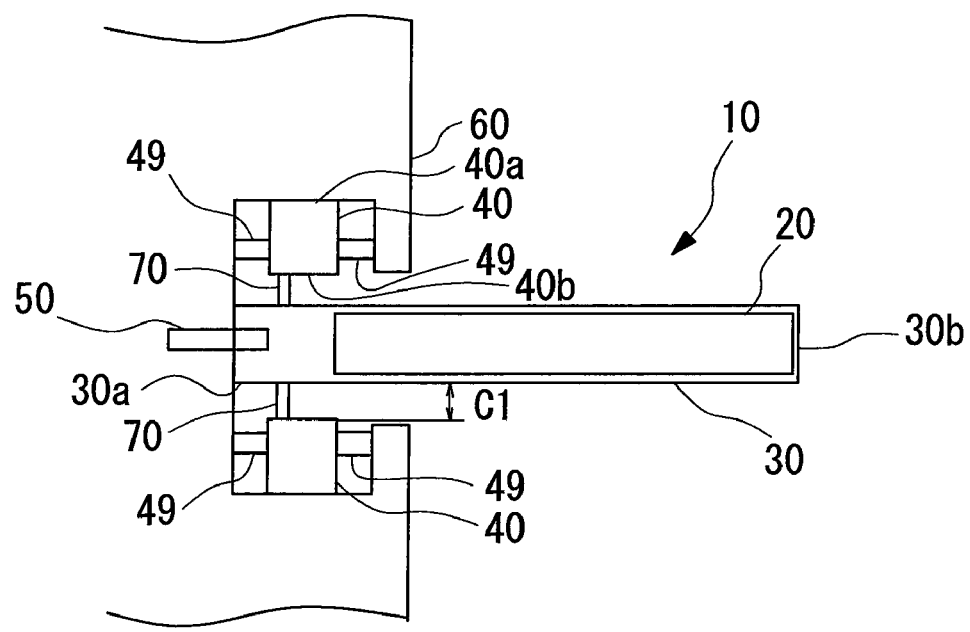
FIG. 1 is a plan view showing the configuration of a detection sensor according to a first embodiment of the present invention.
Figure 2:
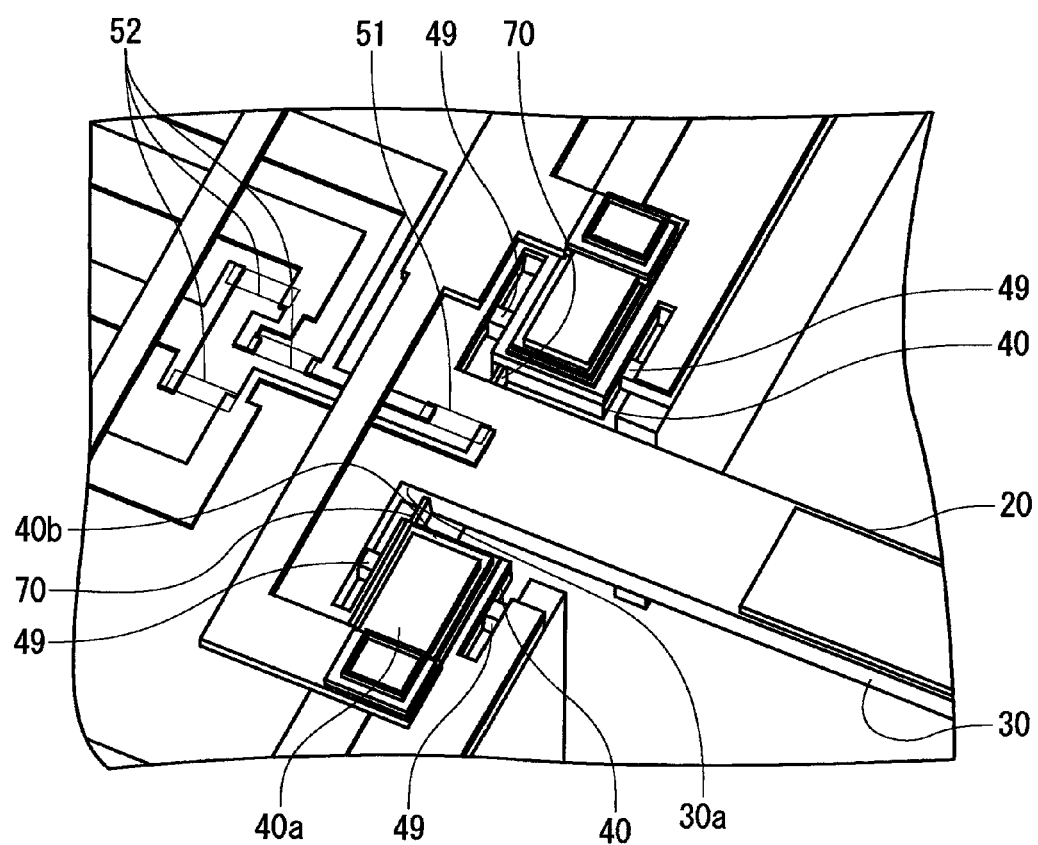
FIG. 2 is a perspective view showing a vibrator and an actuator.

FIGS. 1 and 2 are diagrams illustrating the configuration of a detection sensor 10 according to the present embodiment.

As shown in FIGS. 1 and 2, the detection sensor 10 adsorbs a particular type of molecules (hereinafter simply referred to as molecules) to be sensed, to detect the presence (occurrence) of gas or smell or the concentration thereof. The detection sensor 10 is composed of a vibrator 30 comprising an adsorption section 20 adsorbing the molecules, an actuator 40 driving the vibrator 30, and a detection section 50 detecting that the molecules are adsorbed by the adsorption section 20. The vibrator 30, the actuator 40, and the detection section 50 are formed on a substrate 60 made of a silicon-containing material, using a MEMS technique.

The vibrator 30 is of a cantilever type in which one end thereof is a fixed end 30*a*, whereas the other end thereof is a free end 30*b*. The vibrator 30 appears rectangular in a plan view and is formed of the silicon-containing material making up the substrate 60, particularly preferably single-crystal silicon. By way of example, the vibrator 30 is preferably 2 to 5 μm in thickness, 100 to 1,000 in length, and 30 to 300 μm in width.

The adsorption section 20 is formed on the top surface of the vibrator 30. Here, an Au (gold) film is preferably formed on the surface of the vibrator 30 in order to allow a material forming the adsorption section 20 to adhere better to the surface of the vibrator 30.

The adsorption section 20 can be formed of a film made of an inorganic material or an organic material. A typical example of the inorganic material making up the adsorption section 20 is titanium dioxide ($TiO_2$). In order to increase adsorption efficiency, the titanium dioxide is preferably made porous. The adsorption section 20 is preferably formed over the top surface of the vibrator 30. Examples of the organic material making up the adsorption section 20 include any polymers such as polyacrylic acid, polystyrene, polyacrylamine, polydimethylsiloxane, polyvinyl chloride, and polymethylmethacrylate. The adsorption section 20 may exhibit selectivity for molecules such that the adsorption section 20 adsorbs only the particular type of molecules. The selectivity is considered to be determined by various elements such as a functional group forming the polymer and the state of a cross linkage.

As shown in FIG. 2, the actuator 40 driving the vibrator 30, is provided near the fixed end 30a of the vibrator 30. Like the vibrator 30, the actuator 40 is shaped like a cantilever such that one end thereof is a fixed end 40a, whereas the other end thereof is a free end 40b. Here, the actuator 40 is provided such that an axis connecting the fixed end 40a and the free end 40b together coincides with a direction almost orthogonal to the axial direction of the vibrator 30.

Figure 3:
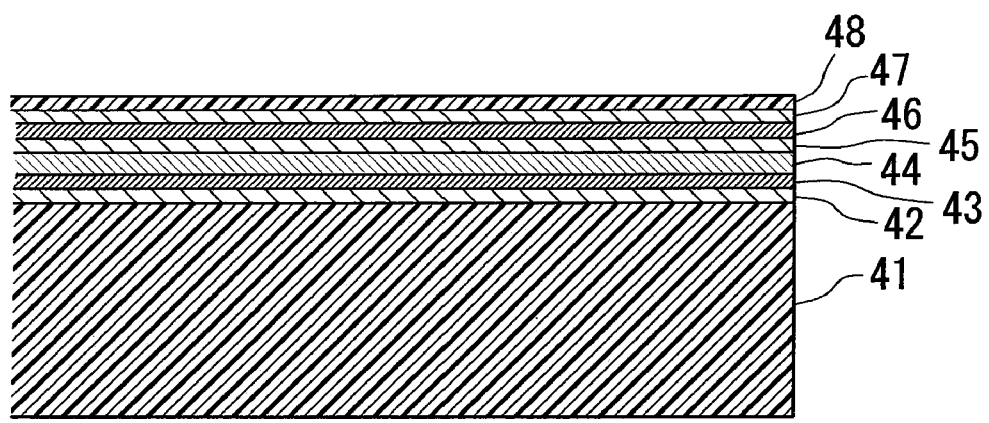
FIG. 3 is a sectional view of the actuator.
Figure 5A:
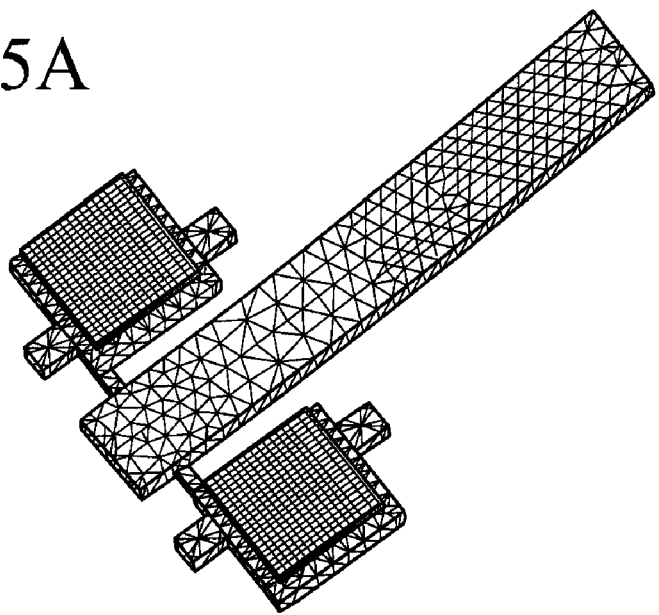
FIGS. 5A and 5B are diagrams showing the results of simulation of vibration in a first-order mode and a second-order mode.
Figure 5B:
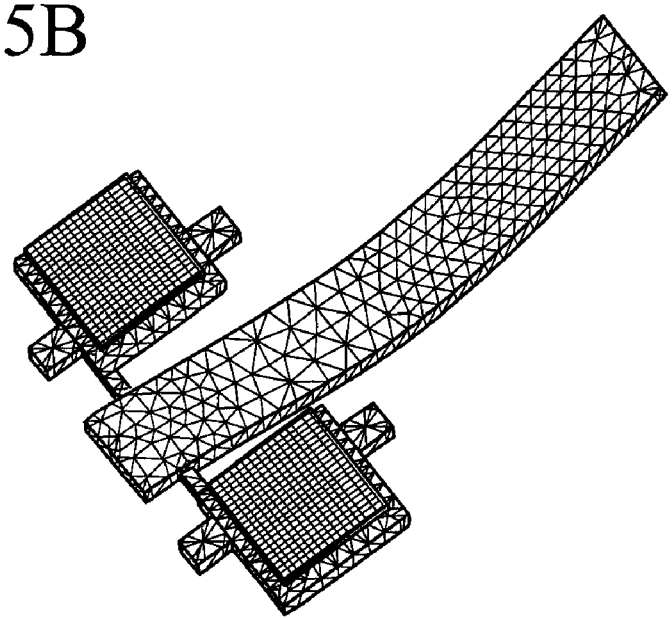
Figure 6A:
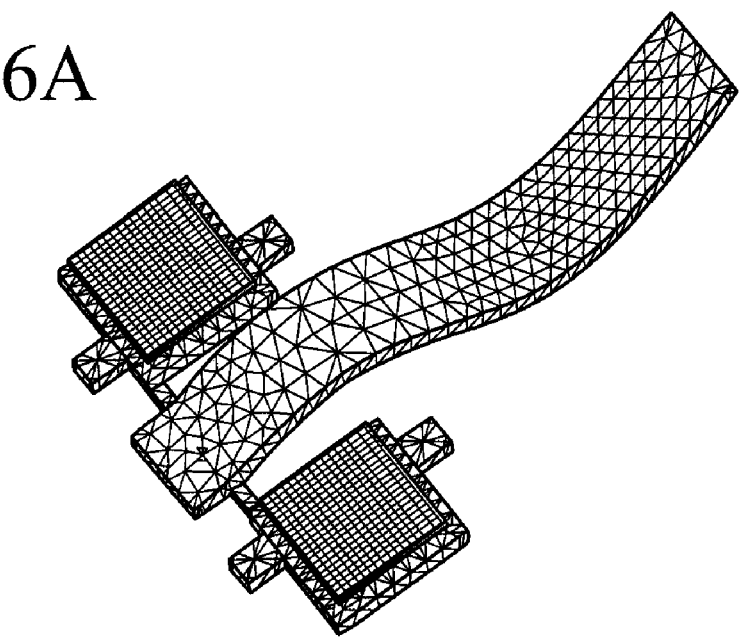
FIGS. 6A and 6B are diagrams showing the results of simulation of vibration in a third-order mode and a fourth-order mode.
Figure 6B:
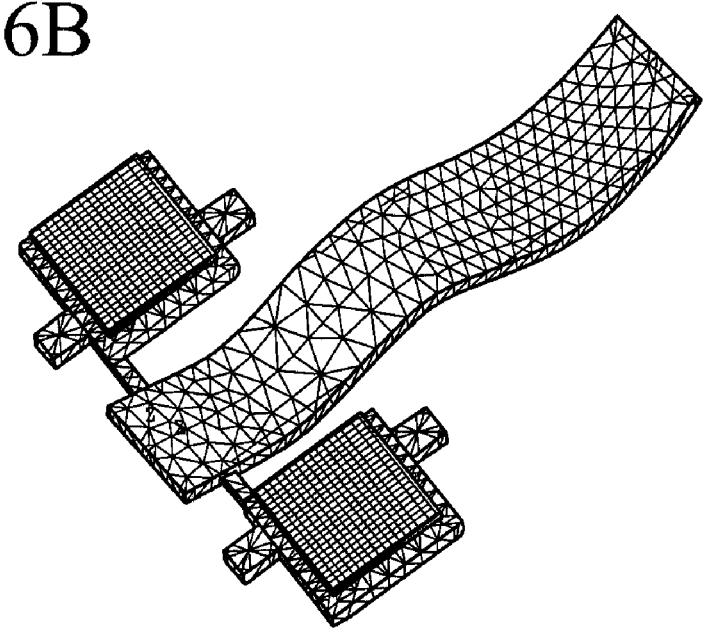

As shown in FIG. 3, the actuator 40 is formed of a base material 41 made of a silicon-containing material, preferably single-crystal silicon or $SiO_2$, and a binder layer 42 made of Ti, an electrode layer 43 made of Pt (platinum), a piezoelectric layer 44 made of a piezoelectric material, a binder layer 45 made of Ti, an electrode layer 46 made of Pt, a binder layer 47 made of Ti, and a surface protection layer 48 made of $SiO_2$ sequentially stacked on the base material 41. The base material 41 formed of single-crystal silicon is electrically conductive. Thus, an $SiO_2$ film is preferably formed on the surface of the base material 41 to provide the base material 41 with an insulating property. Furthermore, the binder layers 42, 45, and 47 enhance the adhesion between the base material 41 and the electrode layer 43, between the piezoelectric layer 44 and the electrode layer 46, and between the electrode layer 46 and the surface protection layer 48, respectively.

As the piezoelectric material forming the piezoelectric layer 44, what is called a ferroelectric thin film formed of a material containing Pb, Zr, and Ti has been gathering attention. More specifically, the piezoelectric layer 44 is formed of the material containing Pb, Zr, and Ti (hereinafter sometimes referred to as a PZT material) and formed to have a thickness of for example, about 500 nm to 2 μm in a crystallized state. This thickness of the piezoelectric layer 44 can be achieved by staking a plurality of thin films each with a thickness of for example, 100 to 130 nm.

Examples of such a material include, for example, Pb perovskite two-component or three-component ferroelectric ceramics, non-lead perovskite structure ferroelectric ceramics, $BaTiO_3$ (barium titanate) ceramics, $KNbO_3$ (potassium niobate) $NaNbO_3$ system ferroelectric ceramics, $(Bi_{1/2}Na_{1/2})TiO_3$ system ferroelectric ceramics, tungsten bronze system ferroelectric ceramics, $(Be_{1-x}Sr_x)_2NaNb_5O_{15}[BSNN]$, $BaNa_{1-x}Bi_{x/3}Nb_5O_{15}[BNBN]$, bismuth layer-like structure ferroelectrics, particle orientation type ferroelectric ceramics, and bismuth layer-like structure ferroelectrics (BLSF).

Alternatively, instead of the PZT material, ZnO (zinc oxide), AlN (aluminum nitride), or the like may be used as the piezoelectric layer 44.

In the above-described actuator 40, when a power source applies an electric signal with a predetermined frequency to the electrode layers 43 and 46, the piezoelectric layer 44 is displaced and vibrated at the above-described frequency.

Here, the free end 40b of the actuator 40 is located opposite the vibrator 30 across a predetermined clearance C1. When the actuator 40 or the vibrator 30 vibrates, a boundary layer is created near the surface of the actuator 40 or the vibrator 30 by friction between the actuator 40 or vibrator 30 and an environment (air) contacting the actuator 40 or the vibrator 30. The clearance C1 is preferably set to be larger than the thickness of the boundary layer to prevent the behavior of the actuator 40 and the vibrator 30 from affecting each other through the boundary layer.

A straightening beam 49 is provided on the sides of the actuator 40. One end of the straightening beam 49 is coupled to the actuator 40. The other end of the straightening beam 49 is coupled to the substrate 60 or the like. The actuator 40 may be warped by, for example, residual stress present in the piezoelectric layer 44, even during a manufacture stage. Thus, the actuator 40 is coupled to the substrate 60 or the like via the straightening beam 49 to inhibit the actuator 40 from being warped.

The straightening beam 49 may be omitted if the amount of warpage is such that the warpage of the actuator 40 poses no problem or if the actuator 40 can be inhibited from being warped.

A coupling beam (coupling member) 70 is provided between the free end 40b of the actuator 40 and the vibrator 30 to couple the free end 40b and the vibrator 30 together. The coupling beam 70 transmits a displacement of the free end 40b made by vibration of the actuator 40 to the vibrator 30. As a result, the vibrator 30 vibrates at the same frequency as that of the actuator 40.

As described above, the vibrator 30 is driven by the actuator 40, provided separately from the vibrator 30. In this case, when a substance with a mass adheres to the adsorption section 20 on the vibrator 30, the frequency of the vibration of the vibrator 30 is changed under the influence of the mass.

Here, the coupling beam 70 may be coupled to the vibrator 30 at any position. However, the coupling beam 70 is preferably provided closer to the fixed end 30a of the vibrator 30. When the coupling beam 70 is connected to the vibrator 30 at a position distant from the fixed end 30a, the high amplitude of the vibrator 30 is transmitted to the coupling beam 70. This results in a heavy energy loss in the vibrator 30. That is, the Q value of the vibrator 30 decreases to degrade detection sensitivity.

The detection section 50 detects a change in the frequency of the vibrator 30 caused by adhesion of a substance with a mass to the adsorption section 20.

The detection section 50 may use any scheme but preferably uses a piezo resistance detection scheme. As shown in FIG. 2, a detecting piezo resistance element 51 is placed near the fixed end 30a of the vibrator 30. Moreover, a reference piezo resistance element 52 is placed at a position on which stress caused by the vibration of the vibrator 30 is prevented to act. Then, a processing circuit (not shown in the drawings) compares values detected by the detecting piezo resistance element 51 and the reference piezo resistance element 52, to detect a change in the vibration frequency of the vibrator 30. Thus, the presence of molecules adsorbed to the adsorption section 20 can be determined, and the amount of molecules adsorbed can be measured.

The behavior of the vibrator 30 based on the scheme configured as described above was analyzed using a finite element method analysis program ANSYS (product name). As a result, as shown in FIGS. 4A, 4B, 4C, 4D, 5A, 5B, 6A, and 6B, the actuator 40 was determined to be able to drive the vibrator 30 in a first-order vibration mode to a fourth-order vibration mode.

Figure 7:
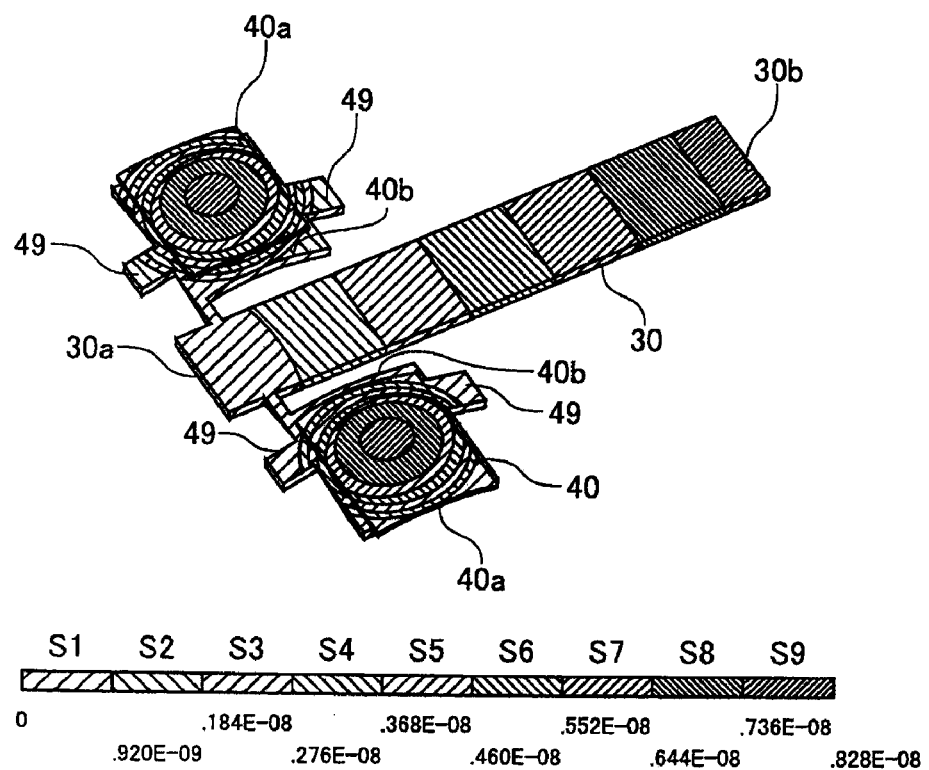
FIG. 7 is a diagram showing the results of simulation of static deformation obtained when a driving force is applied to the actuator.

FIG. 7 shows the results of analysis of the behavior of the actuator 40 and vibrator 30 observed when a static driving force is exerted on the actuator 40. The behavior of the actuator 40 and the vibrator 30 was shown by displacement in nine stages S1 to S9 (S1 denotes a minimum displacement, S9 denotes a maximum displacement, and a darker color indicates a more significant displacement). As shown in FIG. 7, the displacement of the vibrator 30 becomes more significant as a position on the vibrator 30 starting from the fixed end 30a approaches the free end 30b. On the other hand, the actuator 40 is of a cantilever type but is subjected to a more significant displacement near the center thereof. This indicates that the actuator 40 is supported at three points, that is, the fixed end 40a and the straightening beams 49 on the free end 40b side, so that the vibration can be driven without extremely significantly deforming the vibrator 30. FIG. 7 also shows that the vibrator 30 is unlikely to be affected by deformation caused by residual stress present in the actuator 40.

As described above, the present embodiment uses the scheme in which no piezoelectric layer, drive electrode, or the like is provided on the surface of the vibrator 30 and in which the vibrator 30 is driven by the actuator 40 provided separately from the vibrator 30. Thus, the vibration of the vibrator 30 can be prevented from being inhibited by the piezoelectric layer, drive electrode, or the like. Consequently, the Q value of the vibrator 30 can be improved to increase the sensitivity of the detection sensor 10. Furthermore, if the detection sensor 10 is configured to offer a sensitivity equivalent to that of the conventional one, the size of the detection sensor 10 can be sharply reduced compared to that of the conventional one.

The embodiment of the present invention uses the scheme in which no piezoelectric layer, drive electrode, or the like is provided on the surface of the vibrator and in which the vibrator is driven by the actuator provided separately from the vibrator. Thus, the vibration of the vibrator can be prevented from being inhibited by a piezoelectric layer, a drive electrode, or the like. As a result, the vibrator and the detection sensor using the vibrator can offer improved sensitivity. Furthermore, if the vibrator and the detection sensor are configured to offer a sensitivity equivalent to that of the conventional ones, the sizes of the vibrator and the detection sensor can be sharply reduced compared to those of the conventional ones.

Example 1

The vibrator 30 based on the driving scheme according to the present invention was compared with a vibrator based on the conventional driving scheme in terms of the Q value in the first-order vibration mode.

The vibrator based on the conventional driving scheme was formed by sequentially stacking, on an SiO$_2$ base material, a Ti layer (binder layer), a Pt layer (electrode layer), a PZT material layer (piezoelectric layer), a Ti phase (binder layer), a Pt layer (electrode layer), a Ti layer (binder layer), and an SiO$_2$ layer (surface protection layer). In contrast, the vibrator 30 based on the driving scheme according to the present invention was formed of single-crystal Si. The vibrators were formed such that the width was uniformly set to 90 μm, the thickness was set in three ways, that is, set to 3.4 μm, 3.7 μm, and 4.1 μm, and the length was also set in three ways, that is, set to 150 μm, 200 μm, and 250 μm. The Q value of each of the vibrators was calculated. The results are shown in Table 1.

TABLE 1

| Vibrator width | Vibrator thickness | Vibrator length | Q value (first-order mode) | |
| --- | --- | --- | --- | --- |
| | | | Vibrator according to present invention | Conventional vibrator |
| 90 μm | 3.4 μm | 150 μm | 423 | 268 |
| | | 200 μm | 315 | 160 |
| | | 250 μm | 250 | 144 |

TABLE 1-continued

| Vibrator width | Vibrator thickness | Vibrator length | Q value (first-order mode) | |
| --- | --- | --- | --- | --- |
| | | | Vibrator according to present invention | Conventional vibrator |
| | 3.7 μm | 150 μm | 481 | 335 |
| | | 200 μm | 358 | 243 |
| | | 250 μm | 285 | 228 |
| | 4.1 μm | 150 μm | 560 | 445 |
| | | 200 μm | 419 | 301 |
| | | 250 μm | 333 | 290 |

As shown in Table 1, compared to the vibrator based on the conventional driving scheme in which a multilayer film including a PZT material was formed on an SiO$_2$ base material, the vibrator 30 based on the driving scheme according to the present invention exhibited a drastically improved Q value in the first-order vibration mode. Thus, a larger Q value is expected in a higher-order vibration mode.

Second Embodiment

Now, another embodiment of the detection sensor 10 will be shown. Here, an example is shown in which the vibrator 30 behaves in a vibration mode of a high order, that is, a second order or higher.

The detection sensor 10 in the second embodiment shown below is the same as that shown in the first embodiment except for a position where the vibrator 30 is coupled to the actuator 40 via the coupling beam 70. Thus, only the difference will be described, and descriptions of features common to the first embodiment are omitted.

Figure 8:
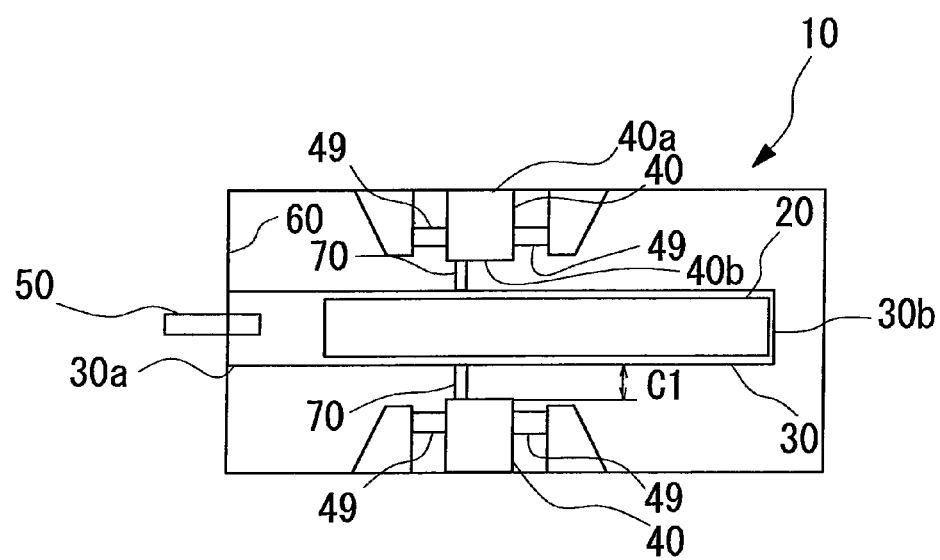
FIG. 8 is a plan view showing the configuration of a detection sensor according to a second embodiment of the present invention.

As shown in FIG. 8, the vibrator 30 is of a cantilever type in which one end is a fixed end 30a, whereas the other end is a free end 30b. The actuator 40 driving the vibrator 30 is provided on each of the opposite sides of the vibrator 30.

The coupling beam 70 is provided between the free end 40b of the actuator 40 and the vibrator 30 to couple the free end 40b and the vibrator 30 together. The coupling beam 70 is coupled to the vibrator 30 at a position corresponding to the order of the vibration mode generated in the vibrator 30, driven by the actuator 40. That is, the coupling beam 70 is coupled to the vibrator 30 at the node point (where the amplitude is zero), shown in FIGS. 4A, 4B, 4C and 4D, of the vibration generated in the vibrator 30 driven in a predetermined vibration mode by the actuator 40.

The node point is determined as described below.

The vibration mode of a beam-like vibrator in which one end is a fixed end, whereas the other end is a free end is expressed by:

$$U_i(x)=B_i\cdot\sin[\{(2i-1)\cdot\pi/2L\}\cdot x]$$

where x denotes the distance from the fixed end of the vibrator to any position on the vibrator in the length direction, $U_i(x)$ denotes the amount of displacement at the position corresponding to x in a Z direction, L denotes the overall length of the vibrator, i denotes the order of the vibration mode, and $B_i$ denotes a constant for the order i of the vibration mode.

At the node point, $U_i(x)=0$. Then, $\sin[\{(2i-1)\cdot\pi/2L\}\cdot x]=0$. Thus, $\{(2i-1)\cdot\pi/2L\}\cdot x=0, \pi, 2\pi, 3\pi, \ldots$ (x<L).

For the order i of 1, 2, 3, or 4, $U_i(x)=0$ in the following cases.

For i=1, x=0.
For i=2, x=0 and 2L/3.
For i=3, x=0, 2L/5, and 4L/5.
For i=4, x=0, 2L/7, 4L/7, and 6L/7.

Here, the coupling beam 70 cannot be coupled to the fixed end 30a of the vibrator 30. Thus, the possible node points where the coupling beam 70 is coupled are as follows.

For i=2, x=2 L/3.
For i=3, x=2 L/5 and 4 L/5.
For i=4, x=2 L/7, 4 L/7, and 6 L/7.

However, the node point where the coupling beam 70 is coupled to the vibrator 30 is preferably selected to be closer to the fixed end 30a of the vibrator 30. This is because when the coupling beam 70 is coupled to the vibrator 30 at a position distant from the fixed end 30a, the high amplitude of the vibrator 30 is transmitted to the coupling beam 70, resulting in a heavy energy loss in the vibrator 30.

The coupling beam 70 transmits the displacement of the free end 40b caused by the vibration of the actuator 40 to the vibrator 30. As a result, the vibrator 30 vibrates at the same frequency as that of the actuator 40.

Thus, the vibrator 30 is driven by the actuator 40 provided separately from the vibrator 30. In this case, when a substance with a mass adheres to the adsorption section 20 on the vibrator 30, the vibration frequency of the vibrator 30 is changed under the influence of the mass.

When the coupling beam 70 is coupled to the vibrator 30 at the node point of the possible vibration in the vibrator 30, the vibrator 30 can be efficiently driven at a low amplitude. Furthermore, the vibration of the vibrator 30 is prevented from being inhibited by the coupling beam 70, thus allowing a possible energy loss to be suppressed. This improves the Q value of the vibrator 30 and thus the detection sensitivity.

Figure 9A:
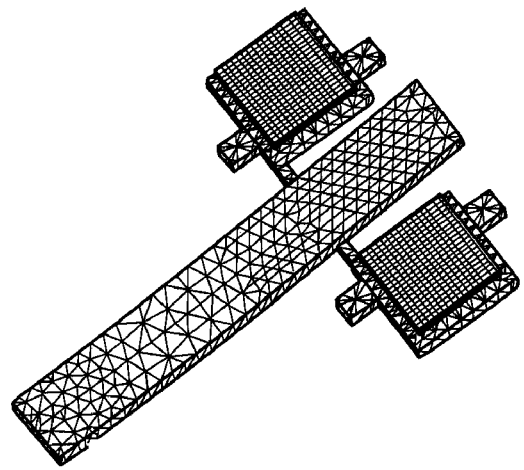
FIGS. 9A, 9B and 9C are diagrams showing the results of simulation of vibration in a second-order mode, a third-order mode, and a fourth-order mode according to the second embodiment.
Figure 9B:
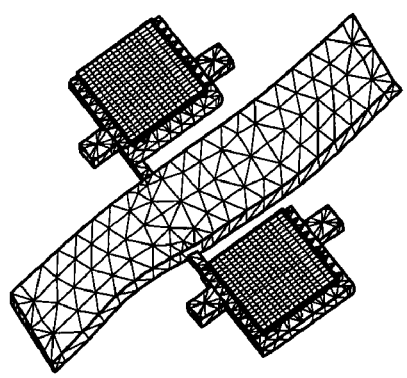
Figure 9C:
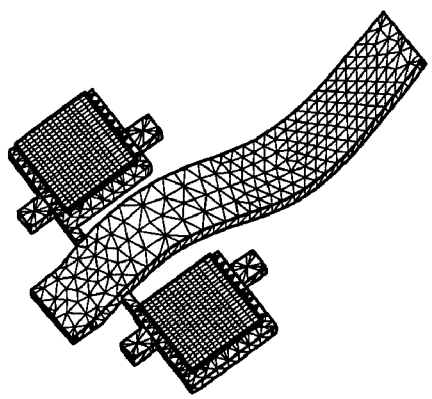

The behavior of the vibrator 30 observed when the vibrator 30 was driven at the node point as described above was analyzed using the finite element method analysis program ANSYS. As a result, as shown in FIGS. 9A to 9C, even when the coupling beam 70 was coupled to the node point on the vibrator 30, the vibrator 30 was determined to be successfully driven in the second- to fourth-order vibration modes by the actuator 40.

In the above mentioned embodiments, the configuration of the detection sensor 10 has been described. However, the illustrated configurations may be appropriately changed in terms of, for example, the shape or orientation of the actuator 40, the position, width, or length of the coupling beam 70, the configuration of the detection section 50, or the like.

Furthermore, the arrangements described above in the embodiments may be sorted out or appropriately changed to the extent that they do not depart from the spirit of the present invention.

The invention claimed is:

1. A detection sensor comprising:
a vibrator shaped like a beam with one end thereof fixed, the vibrator offering a vibration property changed by adhesion or adsorption of a substance with a mass to the vibrator;
an actuator provided near the vibrator and vibrating so as to exhibit a set vibration property;
a coupling member coupling the actuator and the vibrator together to transmit vibration of the actuator to the vibrator to vibrate the vibrator;
a first straightening member;
a second straightening member; and
a detection section detecting the substance by detecting a change in vibration of the vibrator, wherein:
the actuator is separate from the detection section;
the actuator comprises a beam-shaped actuator main body with a fixed end and a free end opposite the fixed end; and
the actuator main body is coupled to the vibrator at the free end, and
the actuator is supported by the fixed end, the first straightening member, and the second straightening member, wherein the first straightening member supports the actuator between the fixed end and the free end at a first side of the actuator, and the second straightening member supports the actuator between the fixed end and the free end at a second side of the actuator opposite the first side.

2. The detection sensor according to claim 1, wherein the actuator comprises:
a piezoelectric layer provided on a surface of the actuator main body in order to vibrate the actuator main body and made of a piezoelectric material; and
a drive electrode provided on the surface of the actuator main body to apply a voltage to the piezoelectric layer.

3. The detection sensor according to claim 2, wherein the first and second straightening members straighten the actuator main body warped by residual stress present in the piezoelectric layer.

4. The detection sensor according to claim 1, wherein the actuator and the vibrator are provided at a distance from each other which is larger than the thickness of the boundary layer formed near the surface of the vibrator when the vibrator vibrates.

5. The detection sensor according to claim 1, wherein the detection section is made of a piezo resistance element provided near a fixed end of the vibrator to detect a change in stress caused by vibration of the vibrator.

6. The detection sensor according to claim 1, wherein the coupling member is coupled to the vibrator at or near a node point of a vibration generated in the vibrator when the vibrator is driven by the actuator in a vibration mode of a high order, that is, a second order or higher.

7. The detection sensor according to claim 1, wherein the detection section detects an amount of the substance adhered to the vibrator.

8. The detection sensor according to claim 1, wherein the substance is particular molecules or plural types of molecules having particular properties or characteristics.

9. A vibrator comprising:
a beam-like vibrator main body with one end thereof fixed;
an actuator provided near the vibrator main body and vibrating so as to exhibit a set vibration property; and
a coupling member coupling the actuator and the vibrator main body together to transmit vibration of the actuator to the vibrator main body to vibrate the vibrator main body,
a first straightening member, and
a second straightening member, wherein:
the actuator comprises a beam-shaped actuator main body with a fixed end and a free end opposite the fixed end;
the actuator is coupled to the vibrator main body at the free end, and
the actuator is supported by the fixed end, the first straightening member, and the second straightening member, wherein the first straightening member supports the actuator between the fixed end and the free end at a first side of the actuator, and the second straightening member supports the actuator between the fixed end and the free end at a second side of the actuator opposite the first side.

10. The detection sensor according to claim 1, wherein the actuator is provided in a direction that intersects with the axial direction connecting opposite ends of the vibrator, and is shaped like a beam with one or opposite ends thereof fixed.

11. The detection sensor according to claim 10, wherein the actuator is provided in a direction almost orthogonal to the axial direction of the vibrator, and is shaped like a beam with one end thereof fixed.

12. The detection sensor according to claim 1, wherein the actuator is supported at least at three points.

13. The detection sensor according to claim 1, wherein the beam-shaped actuator main body is cantilevered from the fixed.

14. The vibrator of claim 9, wherein the beam-shaped actuator main body is cantilevered from the fixed.

15. The detection sensor according to claim 1, wherein free end of the actuator is located opposite the vibrator across a predetermined clearance between the free end and the vibrator, and the coupling member extends across the predetermined clearance from the free end of the actuator.

16. The vibrator of claim 9, wherein free end of the actuator is located opposite the vibrator main body across a predetermined clearance between the free end and the vibrator main body, and the coupling member extends across the predetermined clearance from the free end of the actuator.

* * * * *